(12) United States Patent (10) Patent No.: US 8,306,817 B2
Yu et al. (45) Date of Patent: Nov. 6, 2012

(54) SPEECH RECOGNITION WITH NON-LINEAR NOISE REDUCTION ON MEL-FREQUENCY CEPSTRA

(75) Inventors: Dong Yu, Kirkland, WA (US);
Alejandro Acero, Bellevue, WA (US);
James G. Droppo, Duvall, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 11/970,537

(22) Filed: Jan. 8, 2008

(65) Prior Publication Data

US 2009/0177468 A1 Jul. 9, 2009

(51) Int. Cl.
*G10L 15/00* (2006.01)
(52) U.S. Cl. .................. 704/236; 704/231; 704/239
(58) Field of Classification Search .................. 704/236, 704/239
See application file for complete search history.

(56) References Cited

U.S. PATENT DOCUMENTS

| | | | | |
|---|---|---|---|---|
| 4,837,828 A * | 6/1989 | Watari | ........................ | 704/204 |
| 5,583,968 A | 12/1996 | Trompf | | |
| 6,092,039 A * | 7/2000 | Zingher | ........................ | 704/221 |
| 6,173,258 B1 | 1/2001 | Menendez-Pidal et al. | | |
| 6,330,534 B1 * | 12/2001 | Yasunaga et al. | ............. | 704/223 |
| 6,330,535 B1 * | 12/2001 | Yasunaga et al. | ............. | 704/223 |
| 6,633,839 B2 * | 10/2003 | Kushner et al. | ............... | 704/205 |
| 6,691,090 B1 | 2/2004 | Laurila et al. | | |
| 6,721,698 B1 | 4/2004 | Hariharan et al. | | |
| 6,826,526 B1 * | 11/2004 | Norimatsu et al. | ........... | 704/222 |
| 6,904,404 B1 * | 6/2005 | Norimatsu et al. | ........... | 704/222 |
| 6,937,981 B2 * | 8/2005 | Seo et al. | ....................... | 704/246 |
| 7,027,979 B2 * | 4/2006 | Ramabadran | ................. | 704/205 |
| 7,035,797 B2 | 4/2006 | Iso-Sipila | | |
| 7,062,433 B2 | 6/2006 | Gong | | |
| 7,082,394 B2 * | 7/2006 | Burges et al. | ................. | 704/243 |
| 7,103,547 B2 * | 9/2006 | Kao et al. | ....................... | 704/251 |
| 7,305,339 B2 * | 12/2007 | Sorin | ............................ | 704/250 |
| 7,457,749 B2 * | 11/2008 | Burges et al. | ................. | 704/243 |
| 2002/0177995 A1 | 11/2002 | Walker | | |
| 2003/0065509 A1 | 4/2003 | Walker | | |
| 2003/0191641 A1 * | 10/2003 | Acero et al. | .................. | 704/233 |
| 2004/0052383 A1 * | 3/2004 | Acero et al. | ................. | 381/94.1 |
| 2005/0049857 A1 | 3/2005 | Seltzer et al. | | |
| 2007/0033034 A1 | 2/2007 | Yao | | |

OTHER PUBLICATIONS

Andrew Carl Lindgren,"Speech Recognition Using Features Extracted from Phase Space Reconstructions", Date: May 2003, Milwaukee, Wisconsin (82 pages).

Dimitriadis, et al., "Towards Automatic Speech Recognition in Adverse Environments", National Technical University of Athens, Greece, Sep. 2005, http://cvsp.cs.ntua.gr/projects/pub/HIWIRE/HiwirePublications/DimitriadisEtAl_RobustAsrModulationsFractalsVisualAdaptation_HERCMA.pdf.

(Continued)

*Primary Examiner* — Justin Rider
(74) *Attorney, Agent, or Firm* — Westman, Champlin & Kelly, P.A.

(57) ABSTRACT

In an automatic speech recognition system, a feature extractor extracts features from a speech signal, and speech is recognized by the automatic speech recognition system based on the extracted features. Noise reduction as part of the feature extractor is provided by feature enhancement in which feature-domain noise reduction in the form of Mel-frequency cepstra is provided based on the minimum means square error criterion. Specifically, the devised method takes into account the random phase between the clean speech and the mixing noise. The feature-domain noise reduction is performed in a dimension-wise fashion to the individual dimensions of the feature vectors input to the automatic speech recognition system, in order to perform environment-robust speech recognition.

20 Claims, 4 Drawing Sheets

OTHER PUBLICATIONS

Urbanowic, et al., "Improvement of Speech Recognition by Nonlinear Noise Reduction", Date: Apr. 15, 2006, Dresden, Germany, http://www.citebase.org/fulltext?format=application%2Fpdf&identifier=oai%3AarXiv.org%3Aphysics%2F0507044.

* cited by examiner

SPEECH RECOGNITION WITH NON-LINEAR NOISE REDUCTION ON MEL-FREQUENCY CEPSTRA

BACKGROUND

Automatic speech recognition is a task by which a user speaks an utterance into a computerized speech recognition system, and the speech recognition system recognizes the speech contained in the utterance input by the user. As can be imagined, the utterance input by the speaker, which is typically captured by a microphone, can be corrupted by a variety of different types of noise. The noise in the signal representing the utterance can reduce the accuracy with which the computerized speech recognition system recognizes the speech. Therefore, some current systems attempt to reduce noise in the speech signal in order to improve the accuracy of the speech recognition function performed by the computerized speech recognition system.

Noise reduction techniques have also been employed in speech enhancement environments. In other words, where a human listener is listening to speech that was input by another user in the presence of noise, both noise reduction and speech enhancement can be employed to make it easier for the human listener to listen to the speech.

It is currently believed, by many, that the desirable signal domain to which noise reduction or speech enhancement should be applied is different based on whether the speech signal is to be used for human listening or automatic speech recognition. It is currently widely believed that the lower the distortion is between the enhanced speech and the clean speech in the domain closest to the back end of the system (in a human listening environment, the back end is the portion that allows human perception of the generated speech, and in a speech recognition system, the back end is the portion of the system that performs the machine recognition function), the better the performance will be.

Therefore, for subjective human listening, noise reduction is often applied in the spectral domain. For example, in that scenario, noise reduction can be provided using known techniques such as spectral subtraction, Weiner filtering, and Ephraim/Malah spectral amplitude minimum mean square error (MMSE) suppression. Subjective human listening experiments show that speech enhancement becomes more effective when it is applied to the logarithm spectral amplitude domain. This confirms an observation that the periphery auditory system of a human being performs the kind of compression that is similar to logarithmic scaling.

The discussion above is merely provided for general background information and is not intended to be used as an aid in determining the scope of the claimed subject matter.

SUMMARY

In an automatic speech recognition system, a feature extractor extracts features from a speech signal, and speech is recognized by the automatic speech recognition system based on the extracted features. Noise reduction is provided by feature enhancement in which feature-domain noise reduction is provided based on the minimum means square error criterion. The feature-domain noise reduction is performed in a dimension-wise fashion to the individual dimensions of the feature vectors input to the automatic speech recognition system, in order to perform environment-robust speech recognition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
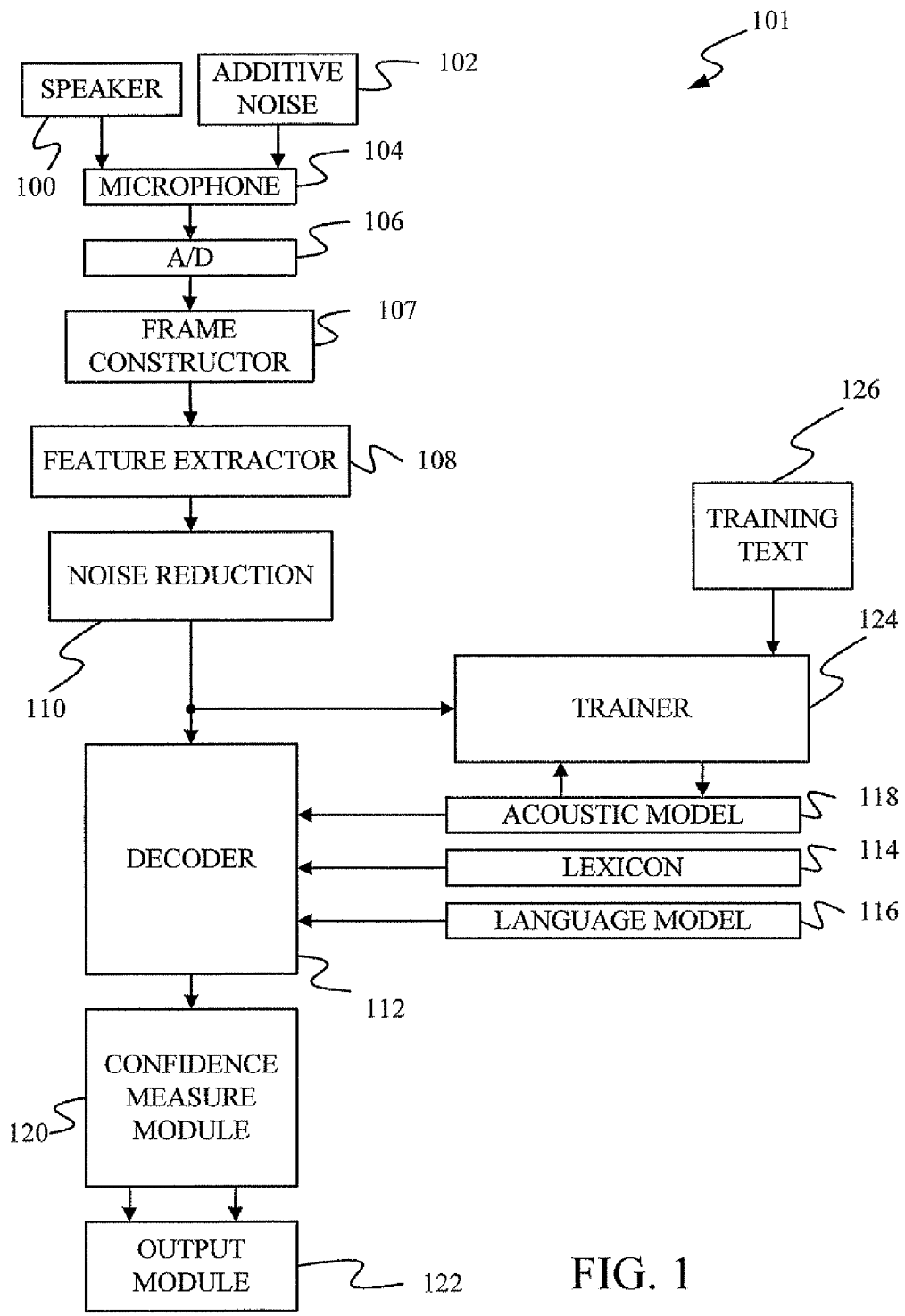
FIG. 1 is a block diagram of one illustrative embodiment of a speech recognition system.

FIG. 1 is a block diagram of one illustrative embodiment of a speech recognition system 101. In FIG. 1, a speaker 100, either a trainer or a user, speaks into a microphone 104. Microphone 104 also receives additive noise from one or more noise sources 102. The audio signals detected by microphone 104 are converted into electrical signals that are provided to analog-to-digital converter 106.

A-to-D converter 106 converts the analog signal from microphone 104 into a series of digital values. In several embodiments, A-to-D converter 106 samples the analog signal at 16 kHz and 16 bits per sample, thereby creating 32 kilobytes of speech data per second. These digital values are provided to a frame constructor 107, which, in one embodiment, groups the values into 25 millisecond frames that start 10 milliseconds apart.

The frames of data created by frame constructor 107 are provided to feature extractor 108, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the present description proceeds by describing feature extraction in terms of MFCC, but the invention is not limited to these feature extraction modules and other modules may be used within the context of the present invention.

The feature extraction module produces a stream of feature vectors that are each associated with a frame of the speech signal. This stream of feature vectors is provided to noise reduction module 110, which removes noise from the feature vectors. Module 110 estimates noise on a dimension-wise basis for the feature vectors and optimizes those dimension values based on the noise estimates.

The output of noise reduction module 110 is a series of "clean" feature vectors. If the input signal is a training signal, this series of "clean" feature vectors is provided to a trainer 124, which uses the "clean" feature vectors and a training text 126 to train an acoustic model 118. Techniques for training such models are known in the art and a description of them is not required for an understanding of the present invention.

If the input signal is a test signal, the "clean" feature vectors are provided to a decoder 112, which identifies a most likely sequence of words based on the stream of feature vectors, a lexicon 114, a language model 116, and the acoustic model 118. The particular method used for decoding is not important to the present invention and any of several known methods for decoding may be used.

The most probable sequence of hypothesis words is provided to a confidence measure module 120. Confidence measure module 120 may identify which words are most likely to have been improperly identified by the speech recognizer, based in part on a secondary acoustic model (not shown). Confidence measure module 120 then provides the sequence of hypothesis words to an output module 122 along with identifiers indicating which words may have been improperly identified. Those skilled in the art will recognize that confidence measure module 120 is not necessary for the practice of the present invention.

Figure 2:
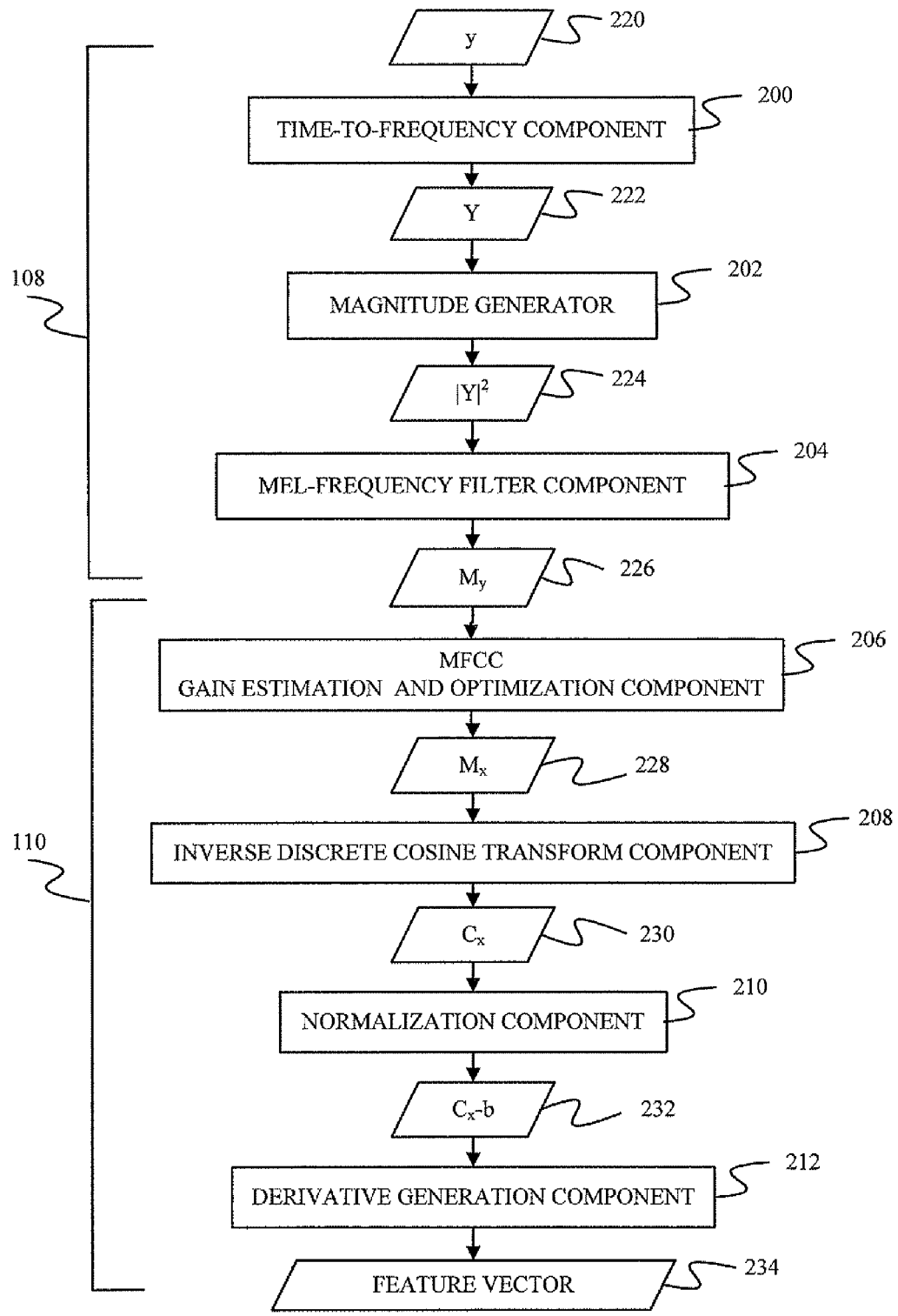
FIG. 2 is a block diagram of one illustrative embodiment of a feature extraction architecture.
Figure 3:
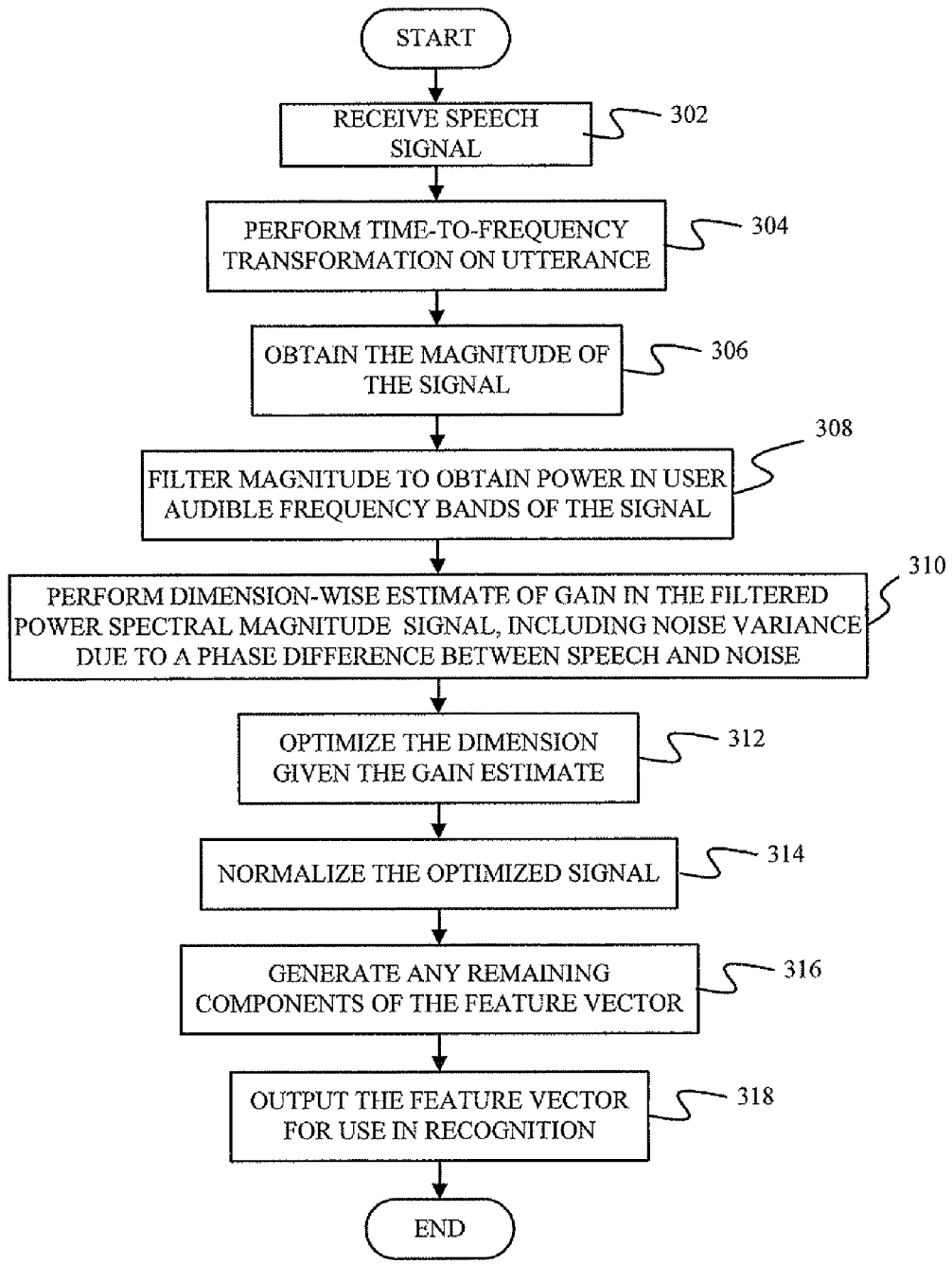
FIG. 3 is a flow diagram illustrating one illustrative embodiment of the overall operation of the architecture shown in FIG. 2 in extracting features.

FIG. 2 shows one illustrative embodiment of a block diagram of a feature extraction pipeline that includes feature extractor 108 and noise reduction module 110. The feature extraction pipeline shown in FIG. 2 includes a time-to-frequency transform component 200, magnitude generator 202, MEL-frequency filter component 204, MFCC gain estimation component 206, inverse discrete cosine transform component 208, normalization component 210, and derivative generation component 212. FIG. 3 is a flow diagram illustrating one embodiment of the operation of the system shown in FIG. 2. FIGS. 2 and 3 are now described in conjunction with one another.

In the embodiment shown in FIG. 2, a segmented speech signal 220 provided by the frame constructor 107 (as indicated by block 302 in FIG. 3), is input to time-to-frequency transform component 200 which converts frames of the speech signal 220 into the frequency domain. This is indicated by block 304 in FIG. 3. In one embodiment, component 200 is a Fast Fourier Transform (FFT) component that performs an FFT algorithm providing, at its output, a number of transform coefficients 222. Magnitude generator 202 generates the magnitude of the transform coefficients 222, and thereby outputs the magnitude 224 of the coefficients. This is indicated by block 306 in FIG. 3.

MEL-frequency filter component 204 is illustratively formed of a plurality of triangular-shaped filter banks with approximately logarithmic spacing (referred to as MEL filter banks). The energy in each of the bands is integrated to provide a set of MEL frequency cepstral coefficients (MFCCs) 206 in the spectrum. The MEL scale is a warping of the frequency axis that models the human auditory system and has been shown to empirically improve recognition accuracy. The MEL frequency filter component 204 thus filters input 224 to obtain the power in frequency bands audible to the human ear. A discrete cosine transform is also illustratively performed on the coefficients in component 204. This is indicated by block 308 in FIG. 3.

MFCC gain estimation component 206 then performs a minimum mean square error (MMSE) estimate against each dimension of the clean speech MFCC vector given the noisy MFCC vector. The dimension wise estimate of gain is performed on the filtered spectral power magnitude signal output by MEL frequency filter component 204. The gain estimates depend on noise variance due to a phase difference between speech and noise. This is indicated by block 310 in FIG. 3.

Then, the dimensions of the power spectral magnitude of the MFCC vector are optimized given the gain estimate. This is indicated by block 312 in FIG. 3, and the corrected output (the clean speech MFCC vectors) are indicated by block 228 in FIG. 3.

Component 208 then performs an inverse discrete cosine transform component to reverse the cosine transform performed in component 204, and the output 230 is then normalized by component 210. Normalization component 210 may illustratively include cepstral mean normalization and active gain normalization, or any other desired normalization techniques. Normalization is indicated by block 314 in FIG. 3. The output of normalization component 314 is indicated by block 232 in FIG. 3.

Component 212 then extracts any other desired features to be used to represent the input utterance and to be included in the output feature vector 234. For instance, the temporal change of cepstral coefficients over a sequence of frames may be a valuable feature. The temporal change, or derivative, may boost the accuracy of the automatic speech recognition system in which the feature extraction pipeline is deployed. Therefore, in one embodiment, component 212 is a derivative generation component that generates the first and second derivatives of input 232. These can be obtained in any desired manner. For instance, they may be obtained by using a simple linear regression formula to obtain the first derivative, and then taking the same linear regression formula and applying it to the first derivative in order to obtain the second derivative. Generating the remaining components of the feature vector is indicated by block 316 in FIG. 3, and assembling and outputting the feature vector 234 for use in the speech recognition system is indicated by block 318.

It can be seen that there are a number of differences between the feature extraction pipeline set out in FIG. 2 and other known approaches. First, suppression is applied to the power spectral magnitude of the filter banks output instead of to the spectral amplitude. In addition, the noise variance used in estimating the error is derived to contain an additional term resulting from the fact that the clean speech and the noise are not in phase with each other. This yields a number of advantages. While the present system is inventive, regardless of whether it provides any or all of these advantages, some of the advantages which have been seen are worth mentioning. First, the feature extraction pipeline does not require a codebook to be constructed using training data and is thus more robust to an unseen environment and is more easily deployed. In addition, it is more efficient and introduces no look-ahead frame delay as can be introduced by other techniques. Also, it is applied to the output of filter bank 204 and can therefore be easily plugged-in to any existing feature extraction pipeline.

The operation of MFCC gain estimation component 206 is now described more formally, for the sake of completeness. First, it is worth deriving a formulation of the problem to be solved in estimating the error using MFCC gain estimation component 206.

Without lack of generality, denote x as the channel convoluted clean speech waveform and refer to it as the clean speech. Assume that x is corrupted with independent additive noise n to become the noisy speech y. That is:

$$y(t)=x(t)+n(t) \qquad \text{Eq. 1}$$

where t is the time index. The problem is to find the MMSE estimate $\hat{c}_x(k)$ against each dimension k of the clean speech MFCC vector $c_x$ given the noisy MFCC vector $c_y$. More specifically, the problem is to find a non-linear mapping $\hat{f}$ from $c_y(k)$ to $\hat{c}_x(k)$ such that:

$$\hat{c}_x(k) = \hat{f}(c_y(k)) \qquad \text{Eq. 2}$$
$$= \underset{f}{\operatorname{argmin}} E\{(f(c_y(k)) - c_x(k))^2\}$$
$$= \underset{f}{\operatorname{argmin}} \int (f(c_y(k)) - c_x(k))^2 dc_x(k).$$

There are a number of reasons for choosing the dimension-wise instead of the full-vector MMSE criterion. First, each dimension of the MFCC vector is known to be relatively independent with each other and the diagonal covariance matrix is used in modeling the MFCC space in automatic speech recognition. Also, the dynamic range of MFCC is different between different dimensions. If the MMSE criterion is applied to the entire MFCC vector, each dimension needs to be weighted differently to avoid the problem that the error is dominated by one or two dimensions. Choosing the appropriate weights is not only difficult but also introduces unnecessary computational overhead. Further, the dimension-wise MMSE criterion decouples different dimensions, making the algorithm easier to develop and to implement. Using calculus of variations, it can be shown that the solution to Eq. 2 is the conditional expectation:

$$\hat{c}_x(k) = E\{c_x(k) \mid m_y\} = \qquad \text{Eq. 3}$$
$$E\left\{\sum_b a_{k;b} \log m_x(b) \mid m_y\right\} = \sum_b a_{k;b} E\{\log m_x(b) \mid m_y\},$$

where $$a_{k;b} = \cos\frac{\pi b}{B}(k - 0.5)$$

are the discrete cosine transform coefficients, $m_y$ and $m_x$ are the Mel-frequency filter bank's output in power for the noisy and clean speech respectively, b is the filter bank channel identifier, and B is the total number of channels.

It is known that:

$$m_y(b) = \sum_f w_b(f)|Y(f)|^2, \qquad \text{Eq. 4}$$

where $w_b(f)$ is the b-th Mel-frequency filter's weight for the frequency bin f, Y(f) is the discrete Fourier transformation (DFT) of the noisy speech waveform y. A similar relationship holds between the filter bank outputs of clean speech $m_x(b)$ and its DFT X(f), and between the filter bank outputs of the noise $m_n(b)$ and its DFT N(f).

Given the additive noise assumption Eq. 1 then:

$$Y(f) = X(f) + N(f). \qquad \text{Eq. 5}$$

Note that according to Eq. 4 and Eq. 5 it can be assumed that $m_x(b)$ is independent of $m_y(b')\forall b' \neq b$ given $m_y(b)$ and thus can be reconstructed solely from $m_y(b)$. That is, Eq. 3 can be further simplified to:

$$\hat{c}_x(k) \cong \sum_b a_{k;b} E\{\log m_x(b) \mid m_y(b)\}. \qquad \text{Eq. 6}$$

The problem can thus be reduced to finding the log-MMSE estimator of the Mel-frequency filter bank's output:

$$\hat{m}_x(b) = \exp(E\{\log m_x(b) \mid m_y(b)\}) \qquad \text{Eq. 7}$$

There can be many different solutions to Eq. 7 based on different assumptions on the noise and noisy speech model. One derivation of the estimator is now described.

The filter bank outputs $m_x(b)$, $m_n(b)$, and $m_y(b)$ take real values in the range of $[0, \infty)$ according to Eq. 4. This leads to difficulties in finding a simple suitable statistic model for them. To overcome this problem, three artificial complex variables $M_x(b)$, $M_n(b)$ and $M_y(b)$ can be constructed such that:

$$|M_x(b)| = m_x(b) = \sum_f w_b(f)|X(f)|^2, \qquad \text{Eq. 8}$$
$$|M_n(b)| = m_n(b) = \sum_f w_b(f)|N(f)|^2,$$
$$|M_y(b)| = m_y(b) = \sum_f w_b(f)|Y(f)|^2.$$

In other words, consider $m_x(b)$, $m_n(b)$, and $m_y(b)$ to be modulus of the constructed complex variables $M_x(b)$, $M_n(b)$ and $M_y(b)$ respectively. Many $M_x(b)$, $M_n(b)$ and $M_y(b)$ would satisfy Eq. 8. Among these, the ones are chosen with uniformly distributed random phases $\theta_x(b)$, $\theta_n(b)$, and $\theta_y(b)$ (which can be considered as the weighted summation of the phases over all the DFT bins). Selecting the uniformly distributed random phases permits the assumption that complex variables $M_x(b)$ and $M_y(b) - M_x(b)$ both follow the zero-mean complex normal distributions, which is found to be a good first-order approximation.

Since $M_y(b)$ contains all information there is in $m_y(b)$, Eq. 7 can be rewritten as:

$$\hat{m}_x(b) = \exp(E\{\log m_x(b) \mid M_y(b)\}) \qquad \text{Eq. 9}$$

To solve Eq. 9, first evaluate the moment generating function:

$$\Phi_b(\mu) = E\{\exp(\mu \log m_x(b)) \mid M_y(b)\} = E\{m_x^\mu(b) \mid M_y(b)\}, \qquad \text{Eq. 10}$$

and then giving the solution to Eq. 9 as:

$$\hat{m}_x(b) = \exp\left(\frac{d}{d\mu}\Phi_b(\mu)\bigg|_{\mu=0}\right). \qquad \text{Eq. 11}$$

It should be noted that:

$$\Phi_b(\mu) = E\{m_x^\mu(b) \mid M_y(b)\} \frac{\int_0^\infty \int_0^{2\pi} m_x^\mu(b) \, p(M_y(b) \mid m_x(b), \theta_x(b)) \, p(m_x(b), \theta_x(b)) dm_x(b) d\theta_x(b)}{\int_0^\infty \int_0^{2\pi} p(M_y(b) \mid m_x(b), \theta_x(b)) \, p(m_x(b), \theta_x(b)) dm_x(b) d\theta_x(b)} \qquad \text{Eq. 12}$$

Since $M_x(b)$ is assumed to follow the zero-mean complex normal distribution, $$p(m_x(b), \theta_x(b)) = \frac{m_x(b)}{\pi \sigma_x^2(b)} \exp\left\{-\frac{m_x^2(b)}{\sigma_x^2(b)}\right\}, \qquad \text{Eq. 13}$$

-continued where $$\sigma_x^2(b) \stackrel{def}{=} E\{|M_x(b)|^2\} = E\{m_x^2(b)\}.$$

Similarly, given that $M_y(b)-M_x(b)$ follows the zero-mean complex normal distribution:

$$p(M_y(b) | m_x(b), \theta_x(b)) \quad \text{Eq. 14}$$

$$= \frac{1}{\pi\sigma_d^2(b)}\exp\left\{-\frac{|M_y(b) - m_x(b)e^{j\theta_x(b)}|^2}{\sigma_d^2(b)}\right\}$$

$$= \frac{1}{\pi\sigma_d^2(b)}\exp\left\{-\frac{|M_y(b)e^{j\theta_y(b)} - m_x(b)e^{j\theta_x(b)}|^2}{\sigma_d^2(b)}\right\}$$

$$= \frac{1}{\pi\sigma_d^2(b)}\exp\left\{-\frac{\begin{array}{c}|m_y(b)\cos\theta_y(b) - m_x(b)\cos\theta_x(b) + \\ j(m_y(b)\sin\theta_y(b) - m_x(b)\sin\theta_x(b))|^2\end{array}}{\sigma_d^2(b)}\right\}$$

$$= \frac{1}{\pi\sigma_d^2(b)}\exp\left\{-\frac{m_y^2(b) + m_x^2(b) - 2m_x(b)m_y(b)\cos(\theta_y(b) - \theta_x(b))}{\sigma_d^2(b)}\right\}$$

Where:

$$\sigma_d^2(b) \stackrel{def}{=} E\{|M_y(b) - M_x(b)|^2\} \quad \text{Eq. 15}$$
$$\geq E\{(m_y(b) - m_x(b))^2\}$$

Since:

$$m_y(b) = \sum_f w_b(f)|Y(f)|^2 = \quad \text{Eq. 16}$$

$$\sum_f w_b(f)(|X(f)|^2 + |N(f)|^2 + 2|X(f)||N(f)|\cos\varphi =$$

$$m_x(b) + m_n(b) + \sum_f 2w_b(f)|X(f)||N(f)|\cos\varphi(f),$$

where $\phi(f)$ is the phase difference between $X(f)$ and $N(f)$, it follows that:

$$\sigma_d^2(b) \geq E\left\{(m_n(b) + \sum_f 2|X(f)||N(f)|\cos\varphi(f)w_b(f))^2\right\} = \quad \text{Eq. 17}$$

$$E\{m_n^2(b)\} + E\left\{(\sum_f 2|X(f)||N(f)|\cos\varphi(f)w_b(f))^2\right\}$$

where the following result has been used:

$$E\left\{2m_n(b)\left(\sum_f 2w_b(f)|X(f)||N(f)|\cos\varphi(f)\right)\right\} \cong 0 \quad \text{Eq. 18}$$

given that $X(f)$ and $N(f)$ are independent of each other. It can be seen that $\Sigma_f 2w_b(f)|X(f)||N(f)|\cos\phi(f)$ approximately follows a zero-mean normal distribution. If its variance is denoted as $\sigma_\phi^2(b)$, then:

$$\sigma_d^2(b) \approx \sigma_n^2(b) + \sigma_\phi^2(b) \quad \text{Eq. 19}$$

where $\sigma_n^2(b) = E\{m_n^2(b)\}$.

By substituting Eq. 13 and Eq. 14 into $\Phi_b(\mu) = E\{m_x^\mu(b)|M_y(b)\}$ in Eq. 12 and replacing variable $\theta_y(b)-\theta_x(b)$ with $\beta(b)$, then:

$$\Phi_b(\mu) = \frac{\int_0^\infty m_x^{\mu+2}(b)\exp\left\{-\frac{m_x^2(b)}{\sigma_x^2(b)} - \frac{m_x^2(b)}{\sigma_d^2(b)}\right\}g(m_x(b))dm_x(b)}{\int_0^\infty m_x(b)\exp\left\{-\frac{m_x^2(b)}{\sigma_x^2(b)} - \frac{m_x^2(b)}{\sigma_d^2(b)}\right\}g(m_x(b))dm_x(b)} \quad \text{Eq. 20}$$

where:

$$g(m_x(b)) = \int_0^{2\pi} \frac{1}{\pi\sigma_d^2(b)}\exp\left\{\frac{2m_x(b)m_y(b)\cos(\beta(b))}{\sigma_x^2(b)}\right\}d\beta(b) \quad \text{Eq. 21}$$

Eq. 21 can be simplified to:

$$g(m_x(b)) = I_0\left(2m_x(b)\sqrt{\frac{v(b)}{\sigma^2(b)}}\right), \quad \text{Eq. 22}$$

where $$I_0(z) = \frac{1}{2\pi}\int_0^{2\pi} \exp\{z\cos\beta\}d\beta, \quad \text{Eq. 23}$$

is the integral representation of the modified zero-th order Bessel function:

$$\frac{1}{\sigma^2(b)} = \frac{1}{\sigma_x^2(b)} + \frac{1}{\sigma_d^2(b)}, \quad \text{Eq. 24}$$

and $$v(b) = \frac{\xi(b)}{1+\xi(b)}\gamma(b) \quad \text{Eq. 25}$$

is defined upon the adjusted a-priori signal-to-noise ratio (SNR):

$$\xi(b) \stackrel{def}{=} \frac{\sigma_x^2(b)}{\sigma_d^2(b)} \cong \frac{\sigma_x^2(b)}{\sigma_n^2(b) + \sigma_\varphi^2(b)}, \quad \text{Eq. 26}$$

and the adjusted a-posteriori SNR:

$$\gamma(b) \stackrel{def}{=} \frac{m_y^2(b)}{\sigma_d^2(b)} \cong \frac{m_y^2(b)}{\sigma_n^2(b) + \sigma_\varphi^2(b)}, \quad \text{Eq. 27}$$

given these definitions Eq. 20 can be rewritten as:

$$\Phi_b(\mu) = \frac{\int_0^\infty m_x^{\mu+2}(b)\exp\left\{-\frac{m_x^2(b)}{\sigma^2(b)}\right\}I_0\left(2m_x(b)\sqrt{\frac{v(b)}{\sigma^2(b)}}\right)dm_x(b)}{\int_0^\infty m_x(b)\exp\left\{-\frac{m_x^2(b)}{\sigma^2(b)}\right\}I_0\left(2m_x(b)\sqrt{\frac{v(b)}{\sigma^2(b)}}\right)dm_x(b)}. \quad \text{Eq. 28}$$

The log-MMSE estimator for the Mel-frequency filter bank's output is:

$$\hat{m}_x(b) = \exp(E\{\log m_x(b) \mid m_y(b)\}) = G(\xi(b), v(b))m_y(b), \quad \text{Eq. 29}$$

where:

$$G(\xi(b), v(b)) = \frac{\xi(b)}{1+\xi(b)}\exp\left\{\frac{1}{2}\int_{v(b)}^\infty \frac{e^{-t}}{t}dt\right\} \quad \text{Eq. 30}$$

can be calculated efficiently. The MMSE estimator for the MFCC is thus:

$$\hat{c}_K(k) \cong \sum_b a_{k_j b} E\{\log m_x(b) \mid m_x(b)\} = \quad \text{Eq. 31}$$

$$\sum_b a_{k_j b} \log(G(\xi(b), v(b))m_y(b)).$$

While the noise suppression rule in Eq. 30 appears in the same form as some prior approaches, two differences remain. First, as indicated by Eq. 29, the suppression rule is applied to the power spectral domain of the filter bank's output instead of the amplitude spectral domain. In fact, applying Eq. 30 to $\sqrt{m_y(b)}$ (i.e., convert $m_y(b)$ to the amplitude spectral domain) would invalidate the derivations starting from Eq. 15 and leads to observed poor noise reduction performance. Also, the a priori and a posteriori SNRs defined in Eq. 26 and Eq. 27 are different from prior approaches. In fact, they have been adjusted to include not only the noise (in the power spectral domain) variance but also the additional variance $\sigma_\varphi^2(b)$ resulting from instantaneous phase differences between the clean speech and the mixing noise.

To apply the noise reduction algorithm Eq. 31, the noise variance $\sigma_n^2(b)$ is estimated, the variance $\sigma_\varphi^2(b)$ introduced by the phase differences, and the clean-speech variance $\sigma_x^2(b)$ (or equivalently the a-priori SNR $\epsilon(b)$) are also estimated.

In one embodiment, the noise variance $\sigma_n^2(b)$ is estimated using a minimum controlled recursive moving-average noise tracker. A decision on whether a frame contains speech is first made based on an energy ratio test:

$$\frac{|\tilde{m}_y(b)|_t^2}{|\tilde{m}_y(b)|_{min}^2} > \vartheta, \quad \text{Eq. 32}$$

where $\theta$ is the threshold, $|\tilde{m}_y(b)|_{min}^2$ is the smoothed (across filter bank channels and time) minimum noise power within a sliding window which can be tracked efficiently, and $|\tilde{m}_y(b)|_t^2$ is the smoothed (using adjacent channels) power of the b-th filter's output (which is in power domain by itself) at t-th frame. If the energy ratio test is true, the frame is assumed to contain speech and the new estimation of the noise variance is:

$$\sigma_n^2(b)_t = \sigma_n^2(b)_{t-1}. \quad \text{Eq. 33}$$

Otherwise, the noise variance is estimated as:

$$\sigma_n^2(b)_t = \alpha\sigma_n^2(b)_{t-1} + (1-\alpha)|m_y(b)|_t^2, \quad \text{Eq. 34}$$

using smoothing factor $\alpha$.

Now, estimation of the phrase variance parameter is discussed. $\sigma_\varphi^2(b)$ can be estimated as:

$$\sigma_\varphi^2(b) = E\left\{\left(\sum_f 2|X(f)||N(f)|\cos\varphi(f)w_b(f)\right)^2\right\} \quad \text{Eq. 35}$$

$$= 4\sum_f E\{(|X(f)||N(f)|\cos\varphi(f)w_b(f))^2\}$$

$$= 4\sum_f E\left\{|X(f)||N(f)|w_b(f)\right\}^2 \int_0^{2\pi} \frac{1}{2\pi}\cos^2\varphi(f)d\varphi(f)$$

$$= 2\sum_f E\{|X(f)||N(f)|w_b(f)\}^2$$

$$= 2\sum_f w_b^2(f)E\{|X(f)|\}^2 E\{|N(f)|\}^2,$$

where the assumption is used in which the clean speech and the noise are independent and the phase difference $\phi(f)$ is uniformly distributed. This approach, however, requires the availability of each DFT bin's estimated speech and noise statistics, which is to be tracked with additional computational cost. Since only the statistics at the filter bank's output are estimated and tracked, $\sigma_\varphi^2(b)$ is approximated as:

$$\sigma_\varphi^2(b) = 2\sum_f w_b^2 E\{|X(f)|\}^2 E\{|N(f)|\}^2 \quad \text{Eq. 36}$$

It should be noted that Eq. 35 depends on $\sigma_n^2(b)$ and $\sigma_x^2(b)$. Therefore, $\sigma_\varphi^2(b)$ is to be estimated after estimating $\sigma_n^2(b)$ and $\sigma_x^2(b)$.

In one embodiment, $\sigma_x^2(b)$ is estimated using a known decision-directed approach. In other words, $\sigma_x^2(b)$ for the current frame is estimated using the estimated clean speech from the previous frame.

Figure 4:
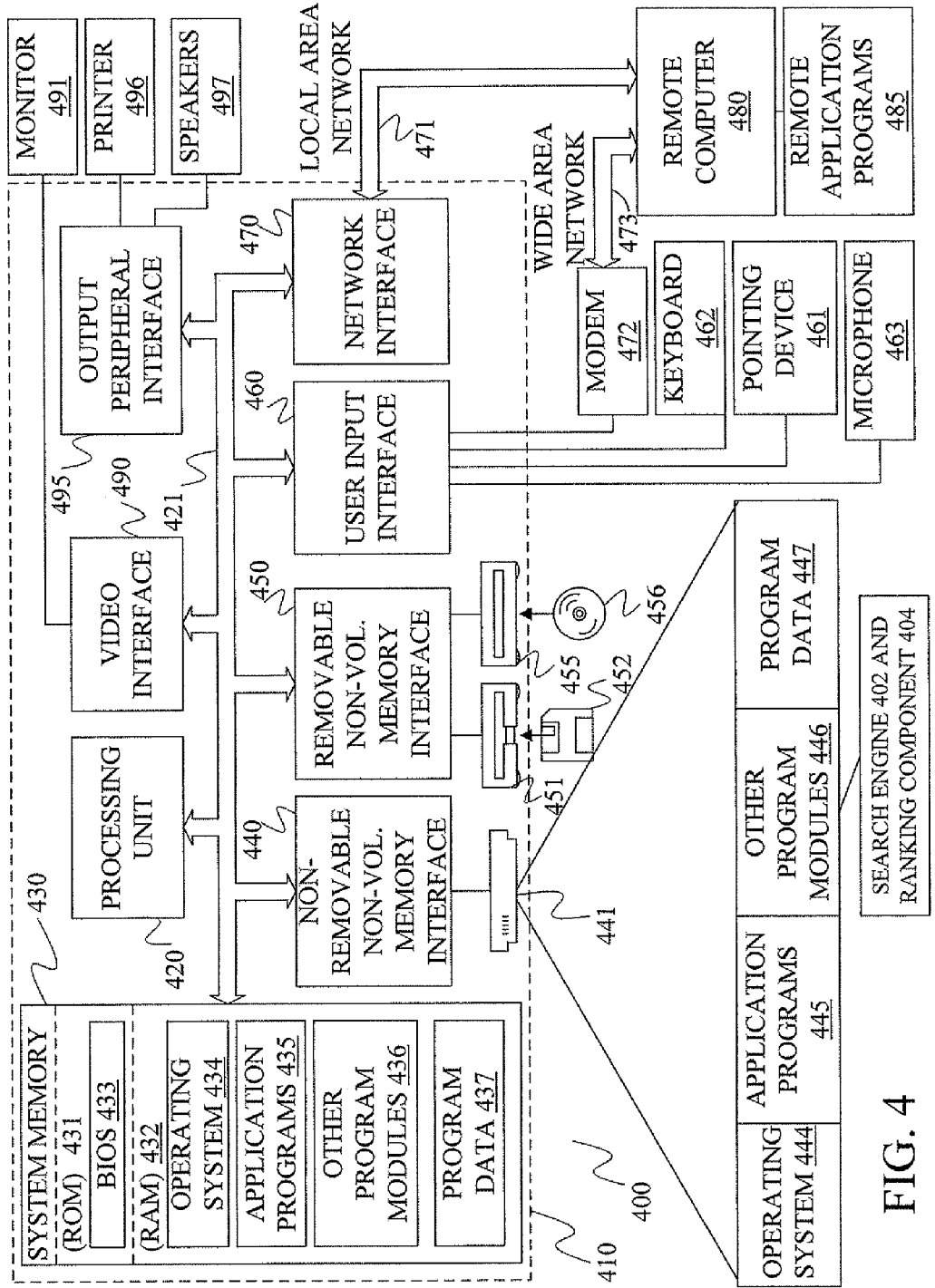
FIG. 4 is a block diagram of one illustrative embodiment of a computing environment.

FIG. 4 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437. The speech recognition system and feature extraction architecture can be implemented in modules 436 or at any other places, as desired.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A feature extraction system in a speech recognition system, comprising:
   a time-to-frequency transform component configured to receive a time domain frame of a speech signal and transform the frame into a frequency domain;
   a frequency filter component configured to filter frequency components of the transformed frame and to provide an n-dimensional vector of n coefficients indicative of power in n unfiltered frequency bands of the transformed frame, one of the coefficients indicating the power in each unfiltered frequency band;
   a processor that is a component of a computing device that utilizes a gain estimation component to estimate a gain for each individual dimension of the n-dimensional vector and to adjust the coefficient for each of the n dimensions based on the gain estimated for each of the n dimensions to obtain n adjusted coefficients;
   a derivative generation component configured to utilize a linear regression formula to generate first and second derivatives of the n adjusted coefficients over a sequence of frames; and
   an output component configured to output a feature vector including the n adjusted coefficients, the first derivatives, and the second derivatives for use by a decoder in the speech recognition system.

2. The feature extraction system of claim 1 wherein the gain estimation component is configured to estimate the gain using the minimum mean square error criterion for each individual dimension.

3. The feature extraction system of claim 2 wherein the gain estimation component is configured to estimate a noise variance based on a difference in phase between speech in the transformed frame and noise in the transformed frame as part of the gain estimation.

4. The feature extraction system of claim 3 wherein the time-to-frequency component provides, as the transformed frame, a plurality of transform coefficients, each corresponding to a frequency band.

5. The feature extraction system of claim 4 and further comprising:
   a magnitude generator configured to generate a magnitude of the plurality of transform coefficients as an input to the frequency filter component.

6. The feature extraction system of claim 5 wherein the frequency filter component comprises:
   a MEL-frequency filter component and wherein the n-dimensional vector of n coefficients is comprised of Mel-frequency cepstral coefficients.

7. The feature extraction system of claim 6 wherein the MEL-frequency component comprises a filter bank of MEL-frequency filters having outputs and wherein the gain estimation component is configured to estimate the gain using the minimum mean square error criterion for each output of the MEL-frequency filter bank and to adjust filter bank power of the noisy speech to obtain the filter bank power of the estimated clean speech.

8. The feature extraction system of claim 7 wherein the MEL-frequency filter component performs a discrete cosine transform function, and further comprising an inverse discrete cosine transform component configured to perform an inverse discrete cosine transform on the filter bank power of the estimated clean speech.

9. The feature extraction system of claim 8 wherein the output component includes a normalization component configured to normalize the adjusted MEL-frequency cepstral coefficients.

10. The feature extraction system of claim 9 wherein the derivative generation component applies the linear regression formula to the first derivatives to generate the second derivatives.

11. A speech recognition system, comprising:
    a backend configured to receive a speech utterance and generate time-based frames of a speech signal based on the speech utterance and based on noise;
    a feature extraction system configured to receive the time-based frames of the speech signal, transform each time-based frame into a vector of frequency domain coefficients each representing power in one frequency band of a spectrum of frequency bands, and filter the frequency bands based on an estimate of human audible frequencies to provide a vector of filtered power spectral magnitude coefficients;
    a gain estimation component configured to receive the vector of filtered power spectral magnitude coefficients and individually estimate a gain for each filtered power spectral magnitude coefficient, the gain depends on a noise variance based on a difference in phase between speech in the in the speech signal and the noise in the speech signal; and to modify the filtered power spectral magnitude coefficients based on the error estimated to obtain a vector of adjusted coefficients;
    a processor that is a component of a computing device configured to utilize a normalization component to apply cepstral mean normalization and active gain normalization to the vector of adjusted coefficients to generate a normalized vector of adjusted coefficients; and
    a speech recognition decoder configured to output an estimate of the utterance based on the normalized vector of adjusted coefficients.

12. The speech recognition system of claim 11 wherein the gain estimation component is configured to estimate the gain for each filtered power spectral magnitude coefficient using minimum mean square error criterion.

13. The speech recognition system of claim 12 wherein the feature extraction system comprises:
    a Fast Fourier Transform component configured to transform the time-based frames into a set of frequency domain transform coefficients; and
    a MEL-frequency filter bank configured to integrate power in each of the frequency bands based on the transform coefficients to generate an output comprising the vector of filtered power spectral magnitude coefficients as a vector of MEL-frequency cepstral coefficients.

14. The speech recognition system of claim 13 wherein the gain estimation component estimates a signal to suppress gain from noisy speech in the output of the MEL-frequency filter bank.

15. The speech recognition system of claim 12 wherein the gain estimation component further comprises:
a derivative generator component configured to generate additional features representative of changes in the adjusted coefficients over time and to output the additional features along with the vector of adjusted coefficients.

16. A method of recognizing speech, comprising:
receiving an utterance;
generating a set of time-based frames of a speech signal based on the received utterance;
transforming each time-based frame into a set of frequency domain MEL-frequency filter bank outputs;
suppressing noise in a power spectral magnitude of the MEL-frequency filter bank output based on an estimate of the noise in individual noisy MEL-frequency filter bank outputs;
estimating an a priori signal-to-noise ratio and an a posterior signal-to-noise ratio based at least in part on a power spectral domain noise variance;
generating a MEL-frequency cepstral feature vector based on the a priori signal-to-noise ratio, the a posterior signal-to-noise ratio, and the power spectral magnitude of the MEL-frequency filter bank output with noise suppressed;
decoding speech based on the feature vector; and
outputting an estimate of speech in the utterance based on the decoded speech.

17. The method of claim 16 wherein transforming comprises:
performing a Fast Fourier Transform on each of the time-based frames.

18. The method of claim 16 wherein suppressing comprises generating the estimate of the noise to include a noise variance value based on a difference in phase between speech in the speech signal and noise in the speech signal.

19. The method of claim 18 wherein suppressing comprises generating the estimate of the noise using a minimum mean square error criterion.

20. The method of claim 16 wherein generating a feature vector comprises:
generating additional features for the feature vector based on changes over time in the power spectral magnitude of the MEL-frequency filter bank output with noise suppressed.

* * * * *